Aug. 14, 1962  J. C. MEDLEY ETAL  3,049,187
STEERING MECHANISM
Filed Feb. 1, 1960  2 Sheets-Sheet 2

INVENTORS:
JACKSON C. MEDLEY
DALE E. PFLEDERER
BY
John F. Schmidt 3,049,187
STEERING MECHANISM
Jackson C. Medley, East Peoria, and Dale E. Pflederer, Tremont, Ill., assignors to LeTourneau-Westinghouse Company, Peoria, Ill., a corporation of Illinois
Filed Feb. 1, 1960, Ser. No. 5,830
5 Claims. (Cl. 180—79.2)

This invention relates to steering mechanism, especially to such mechanism as may be applied to earthmoving equipment, tractors, and the like.

As will be understood by those skilled in the art of earthmoving, equipment of this nature does its work off highways and thus often has to traverse rather rough terrain. The size and the operation of the equipment make power steering a virtual necessity in the vast majority of applications. However, the character of the terrain is such that the equipment which is power steered is likely to encounter unyielding obstacles in the form of large rocks, masonry walls, or the like which, for the purpose of this discussion, may be considered immovable. While the steering mechanism must be such as to provide a maximum of control for the operator, it should preferably be designed with a normally rigid link which can give way before damage to the steering system takes place. A further factor to be borne in mind in equipment of this type and the uses to which the equipment may be put is the fact that failure of the steering power assist may take place; in that event, it is desirable that the mechanism be capable of functioning so as to permit manual steering without having the link give way.

It is accordingly an object of this invention to provide a steering mechanism which incorporates a normally rigid link capable of transmitting forces less than a predetermined force but yielding when subjected to a force at least as great as the predetermined force, the system being such as will permit operation of the steering mechanism without yielding of the link but which will not cause the operator to lose control by spinning the wheel out of his hands as the equipment strikes an obstacle great enough to cause yielding of the normally rigid link. This and other objects are accomplished in the mechanism described below and illustrated in the accompanying drawings, in which:

Figure 1:
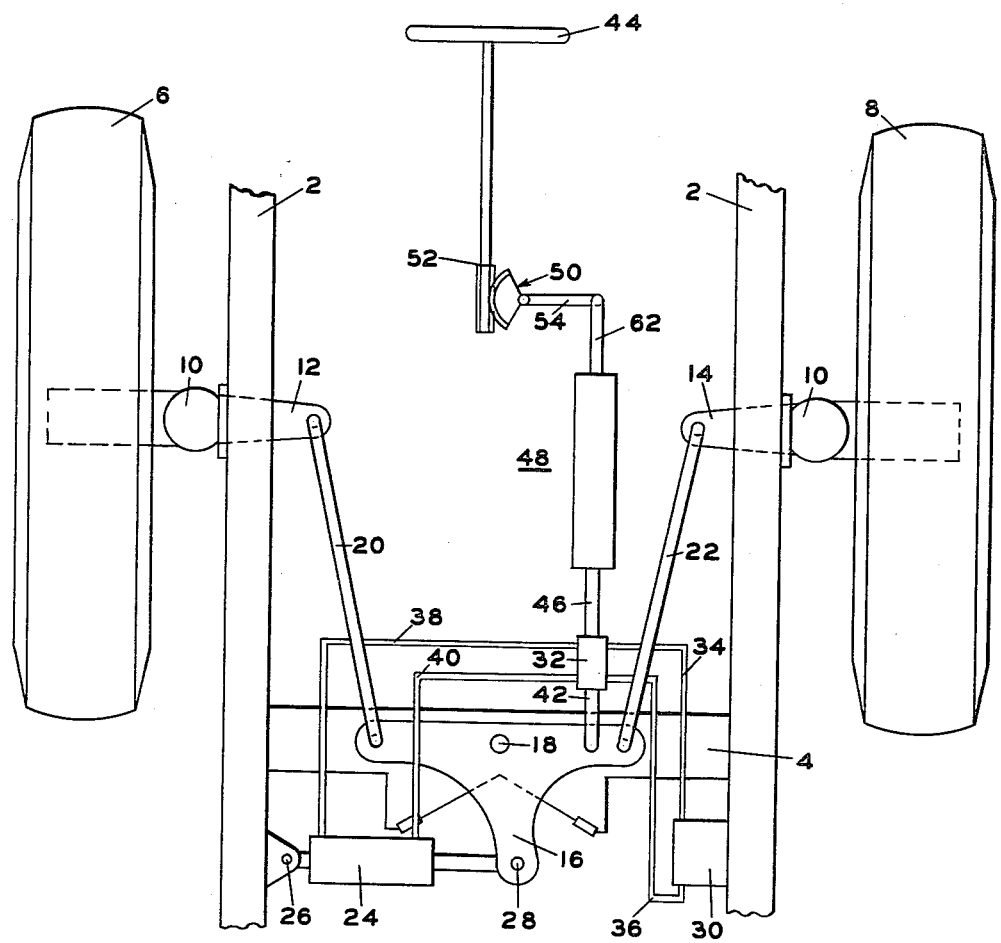
FIG. 1 is a top plan view (largely schematic) of the steered end of a vehicle embodying the invention.

FIG. 1 shows the steered end of a vehicle having a conventional frame including side members 2 and a cross member 4. At least one dirigible member is mounted on the frame in such a manner as to permit change of orientation of the member relative to the frame for steering purposes. It will be understood by those skilled in the art that this member might be a skid or runner, a wheel, a rudder, or the like. In the embodiment here shown, the dirigible member is a wheel. Furthermore, this particular embodiment of the invention illustrates two dirigible wheels shown at 6 and 8. The wheels 6 and 8 are pivotally mounted at 10 in any conventional manner, the over-all mounting means including steering arms 12 and 14.

An actuator 16 is movably mounted relative to the frame of the vehicle. More specifically, actuator 16 is pivotally mounted at 18 on the cross member 4 and is connected with steering arms 12 and 14 by means of connecting elements 20 and 22.

Manually operated means are connected with the actuator 16 as will be explained below in detail. It will of course be appreciated that large size equipment of the type found in the earthmoving industry is preferably power steered. However, it is desirable in many applications to provide a steering system which permits manual steering in case the power steering assist fails for some reason or other.

In the embodiment shown, a steering motor 24 is shown connected to move the actuator 16. More specifically the steering motor here shown is a pressure fluid operated device such as a hydraulic or pneumatic jack. For the purpose of this discussion, it may be assumed that the motor here shown is a hydraulic jack having a conventional cylinder and piston, one of which is pivotally connected to the frame at 26, the other being pivotally connected to the actuator at 28.

The system includes means to supply energy of a type capable of utilization by the motor means 24. Such an energy supply means is shown schematically at 30; in the embodiment here shown the energy supply means 30 may be any suitable hydraulic pump. The pump 30 is connected with the motor 24 by any suitable means to convey energy from the pump 30 to the motor 24. Inasmuch as the operator must be capable of controlling the steering direction, the system must include energy flow directing means. In the embodiment shown, the energy flow directing means is a conventional steering valve 32. Valve 32 has a pair of ports which are connected with the pump by means of conduits 34 and 36. Valve 32 has another pair of ports connected with the motor by means of conduits 38 and 40. The ports constitute connections to receive and to discharge flowing energy.

The energy flow directing means 32 is connected to be under the control of the operator. In order that the system may have follow-up characteristics, valve 32 is connected to the dirigible wheel through actuator 16. It will of course be well understood that valve 32 has at least two relatively moving parts, one of which is associated with the actuator 16 by means of the connection 42. The other of the two relatively moving parts is associated with the operator-operable means, here shown as a steering wheel 44. It will be further obvious to those skilled in the art that, in a conventional valve, there are limits to the amount of relative movement of said two parts; and that, after the amount of movement in either direction from "center" required to make the necessary flow connections, the parts "go solid" by means of suitable stops, and thereafter those two parts move as one, in order to transmit the forces necessary to permit manual steering in case of loss of power.

Figure 2:
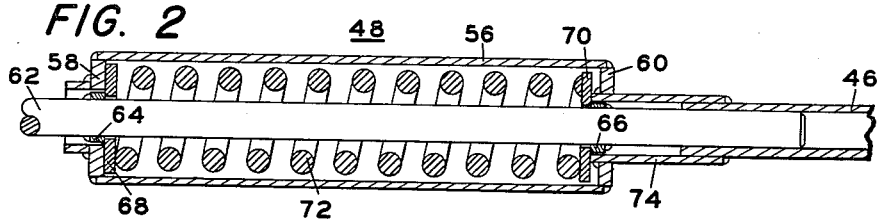
FIG. 2 is a longitudinal sectional view through the normally rigid link.
Figure 3:
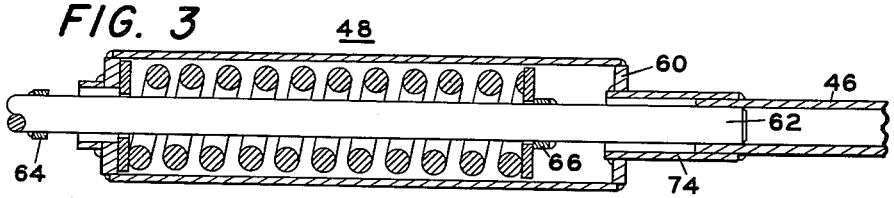
FIG. 3 is a view similar to FIG. 2 but showing the link in one of its yielded positions.
Figure 4:
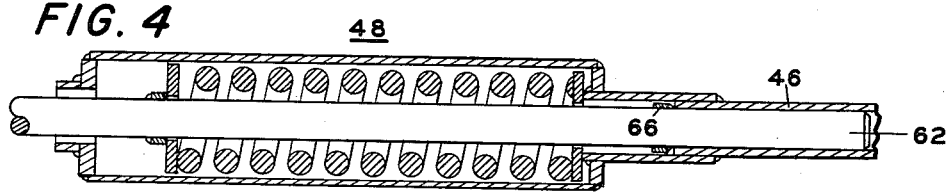
FIG. 4 is another view similar to FIG. 2, but showing the link in still another one of its yielded positions.

More specifically, valve 32 has a connection 46 with a normally rigid link 48, the details of which are shown in FIGS. 2–4, to be described below. Link 48 is connected with the operator-operable means 44 through invertible power transmitting means of any suitable type. In the embodiment shown, the invertible power transmitting means is a conventional worm and gear (or sector) as shown at 50. As will be explained below, the invertible power transmitting means preferably has a higher efficiency for power flow in one direction than for power flow in the inverse direction.

From the foregoing, it will be apparent that the operator-operable means 44 is connected with dirigible wheel 6 by means of invertible power train 50, link 48 (which is normally rigid), valve 32, actuator 16, connecting element 20, and wheel steering member 12. It will be evident also that the identified elements are connected in series, with the result that the wheel steering forces, transmitted to wheel 6 by an operator turning wheel 44, pass through each and every one of the identified elements in turn. Conversely, road shock initiated by wheel 6, in going to steering wheel 44, must pass through or be transmitted by each and every one of the identified elements, in turn.

At this point, the terminology used here should be explained. Because the operator must be able to control the steering direction, the verb "to reverse" is here used as meaning to change the steering direction, and the verb "to invert" is used here to mean a change in the direction of power flow, regardless of steering direction. Thus, the power transmitting means 50 has a first power connection 52 and a second power connection 54. It will be understood by those skilled in the art that the normal use of the power transmitting means 50 is such as to make the first connection 52 the input connection and the second connection 54 the output connection. When the power flow is inverted, the second connection 54 becomes the input connection and the first connection 52 becomes the output connection.

In view of the above listed desirability of an invertible power transmitting means in which the efficiency is greater for power flow in one direction than the other, it will be realized by those skilled in the art that a worm gear type of power train is particularly well suited to an application of this type inasmuch as that is a characteristic of power trains of this type. Even in the most highly efficient types of worm gears, the efficiency is usually somewhat higher for power flowing in one direction than for power flowing in the inverted direction.

It may be noted at this point that, as here used, the terms "high efficiency" and "low efficiency" are purely relative. In other words, where reference is to a "high efficiency" input, it is intended merely to indicate that the efficiency of the train when operating in this manner is higher than the efficiency of the train operating in the other direction; if one efficiency is 40 percent and the other efficiency is 35 percent, the 40 percent efficiency is the "high" efficiency even though the efficiency might be considered low on an absolute basis.

Reference will now be had to FIG. 2 for a description in detail of the normally rigid link 48. It will of course be understood that the link here shown is illustrated only in order to show a workable structure. Other types of normally rigid links may be used, and the details of this link form no part of the invention.

As here shown, link 48 includes a cylindrical member 56 having apertured ends 58 and 60. The ends 58 and 60 are provided with central apertures to accommodate a rod 62 to which stops in the form of collars 64 and 66 are securely affixed. Stops 64 and 66 are capable of passing through the apertures without interfering therewith.

End plates 68 and 70, also centrally apertured, are disposed between the stops 64 and 66. In the rigid condition of the link, as shown in FIG. 2, end plate 68 is adjacent the stop 64 and end plate 70 is adjacent the stop 66. A coil spring 72 is compressed and held between the end plates 68 and 70.

Some elaboration on the structure of end 60 is desirable at this point. As here shown, the end 60 comprises a substantially circular disk to which there is secured a tube 74. In turn, a smaller tube is secured inside the tube 74. Rod 62 reciprocates inside the smaller tube and should be long enough that its end does not pull out of the smaller tube for movement of rod 62 to the left as far as possible during operation of the link. Furthermore, tube 74 must be long enough that the stop 66 does not strike the end of the smaller tube to interfere with movement of rod 62 to the right during operation of the link 48.

It will be noted that, as here shown, the rod 62 is connected to the second connection 54, and the "smaller tube" referred to in the foregoing paragraph is shown as being the connection 46 in FIG. 1 and referred to above.

Operation

In order better to explain the operation of the invention, it is desirable to set forth some of the background conditions and the requirements imposed upon the equipment by those conditions.

Reference was made above to the fact that the steering power assist might fail, in which case it is desirable that the equipment be steerable manually if possible. If the equipment is to be capable of manual steering, then the normally rigid link 48 must be designed to have sufficient strength that it will not yield under the conditions which are likely to be imposed on the system in the event of failure of the steering power assist. In such an event, it may be assumed that as many as two men may apply themselves to the steering wheel in an attempt to manhandle the system enough to steer the equipment manually. The force which those two men apply to the rim of the steering wheel is of course amplified by the mechanical advantage of the system computed from the rim of the wheel to the nearest connection of the link—i.e., from the rim of wheel 44 to the point at which rod 62 connects with the second connection 54. While the force will be amplified by the mechanical advantage of the system as aforesaid, it will be diminished somewhat by the fact that the efficiency of the system is less than unity. Accordingly, the link 48 must be so designed as to remain rigid when subjected to the forces transmitted to rod 62 by two men attempting to turn steering wheel 44.

While it is of course not possible to give a precise figure to represent the force of two men inasmuch as the strength of a man varies with the individual, it is possible to arrive at a reasonable figure and, for that purpose, it is often assumed that one man can exert a force of 100 pounds on the rim of a steering wheel. Using this figure, it is of course possible to arrive at some predetermined force for design purposes, taking into account the mechanical advantage and the efficiency, which represents a force at which the normally rigid link begins to yield; in that case, the link will of course be rigid when subjected to forces less than the predetermined force.

As was pointed out above, one condition for which this steering system is designed is the condition in which a steerable wheel strikes what may be considered for this purpose an immovable object. When that happens, it is desired that the link yield rather than that something in the steering system break, and this yielding of the link should occur without snapping the steering wheel out of the operator's hands. From this it can be seen that the force imposed on rod 62 by the link 48, acting back through the invertible power transmitting means 50, should not be greater than can be resisted by one operator holding the steering wheel.

For a mathematical analysis of the foregoing, let $x$ = the force one man is able to bring to bear at the rim of the steering wheel;

$y$ = the maximum force the normally rigid link can transmit without yielding;

$z$ = the mechanical advantage of the system from the steering wheel rim to the near end of the normally rigid link;

$e_1$ = the efficiency of the system for power flowing from the steering wheel to the link; and $e_2$ = the efficiency of the system for power flowing from the link to the steering wheel.

Then (1) $$2x \cdot e_1 \cdot z = y$$

this being the equation which says that the efforts of two men tugging at the steering wheel shall be equal to the maximum force the link can transmit without yielding. Furthermore, (2) $$x = \frac{y \cdot e_2}{z}$$

which means that the force $y$, acting back through the power train, shall be equal to the efforts of one man holding the wheel. Solving Equation 1 for $x$, we find that (3) $$x = \frac{y}{2e_1 \cdot z}$$

whereupon (4) $$\frac{y}{2e_1 \cdot z} = \frac{y \cdot e_2}{z}$$

Equation 4 simplifies to (5) $$e_1 \cdot e_2 = \frac{1}{2}$$

A few numerical examples are now presented to illustrate the foregoing analysis. If $e_1 = .8$, then, to satisfy Equation 5, $e_2 = .625$, and it may be assumed for purposes of illustration that $z = 5$. Taking $x = 100$ as a reasonable value, from Equation 1, we find that $$y = 200 \cdot .8 \cdot 5 = 800$$

which means that link 48 should be designed to remain rigid for all forces less than or equal to 800 pounds.

Using the value of $y$ thus obtained in Equation 2, we find that $$x = \frac{800 \cdot .625}{5} = 100$$

which means that an 800 pound force, "feeding back" through the worm train, exerts a force of 100 pounds at the rim of the steering wheel, and that is a force which the operator is capable of holding.

The foregoing example illustrates the limiting conditions. A look at the structure of link 48 shows that a force which is capable of collapsing spring 72 is necessarily greater than the value of $y$, which means that, as soon as spring 72 collapses to any appreciable extent, the force which appears at the wheel rim exceeds the 100 pounds which one man can hold. This assumes that spring 72 has a positive spring rate, which is a conventional characteristic of such springs.

To provide a margin of safety, the system should be designed so that $e_1 \cdot e_2$ is less than one half. Thus, if $e_1 = .7$ and $e_2 = .6$, using Equation 1, $$y = 200 \cdot .7 \cdot 5 = 700$$

and Equation 2 gives us $$x = \frac{700 \cdot .6}{5} = 84$$

but since one man can exert a force of 100 pounds, in this example there is a "margin" of 16 pounds to provide for some collapse of the spring 72 before the operator is likely to lose control of the steering wheel.

It will be evident to those skilled in the art that link 48, and the efficiencies and mechanical advantage of train 50, can be matched in design to provide that the spring will collapse a maximum (either by "going solid" or by engaging positive stops, not shown) if subjected to a force that, when "fed back" through the invertible power train, is no greater than 100 pounds—or whatever value is taken as the force one man can apply to the steering wheel rim.

Although Equation 5 merely requires that the product of the two efficiencies equal one-half, it can be shown that $e_1$ should be greater than $e_2$. In the above example where $e_1$ was taken as .8 and $e_2$ was taken as .625, so that $$e_1 \cdot e_2 = \frac{1}{2}$$

the value of $y$ came out to 800 pounds. Now, if $e_1 = .625$ and $e_2 = .8$, then Equation 5 is still satisfied, but the value of $y$ becomes, according to Equation 1

$$200 \cdot .625 \cdot 5 = 625 \text{ pounds}$$

which means that where $e_2 > e_1$, spring 72 must be considerably weaker than for the same efficiencies with $e_1 > e_2$, as demonstrated by a maximum force capacity of 625 pounds without yielding as opposed to 800 pounds.

In the statement of objects and in the claims, the terminology used refers to a normally rigid link which is rigid when subjected to forces less than a predetermined force. From the definitions given above, it will be seen that the "predetermined force" is not the same as the force $y$; rather, the predetermined force equals $y$ plus a small additional force, as will be understood by those skilled in the art.

The foregoing mathematical analysis provides a background which makes for easier understanding of the operation of this steering mechanism. As the operator turns steering wheel 44 to effect a change in the direction of motion of the vehicle, the operator's efforts are applied to the connection 52 which becomes the input connection of the power train 50. Those efforts come out of the power train 50 by way of connection 54, which is then the output connection. Since only one man has hold of steering wheel 44 at this stage, the forces applied to link 48 are well below the aforesaid predetermined forces, and link 48 remains essentially solid for the purposes of this discussion. The motion imparted to link 48 is passed along to valve 32, which then assumes an operating position such that one end of jack 24 is exposed to fluid under presure and the other end is connected with the pump intake or the tank as the case may be. Thereupon, the motor 24 works on actuator 16 to turn the dirigible wheels 6 and 8 about their pivot axes in the direction selected by the operator. Valve 32 is connected with actuator 16 so as to respond to steering movement of wheels 6 and 8, and valve 32 returns to a neutral operating position in a manner that is conventional in steering apparatus of this type. This phase of the operation is entirely conventional and will be readily understood by those skilled in the art.

If the operator should have his head turned toward the rear to watch what is happening to a trailing portion of his equipment and he then runs one of the dirigible wheels into a masonry wall, it may be assumed for this discussion that the masonry wall is an immovable object, and something on the vehicle will have to yield or break. The wheel which strikes the wall will be forcibly pivoted about its steering axis and the steering motion will be transferred to actuator 16 and thence to steering wheel 44 by way of link 48 and power train 50. If the system is designed with the balance referred to in the above mathematical analysis, spring 72 of link 48 will collapse, and thus link 48 will not transmit to steering wheel 44 a force greater than the operator can resist, until the spring in link 48 goes solid. Obviously, the designer will have to make some assumptions and will have to set some practical limit to the amount that spring 72 is permitted to collapse. some arbitrary limit will have to be provided and it will be obvious to those skilled in the art that, no matter what the limits of the system are, it will always be possible to set up circumstances which will exceed the physical limits of the equipment. However, these limitations are always present and experience in different types of operations will show what the practical design limits should be for the link, such as the one shown at 48 in this embodiment of the invention.

In the circumstances assumed just above, where one dirigible wheel is forcibly deflected by an obstacle, power train 50 operates in the inverted direction; in this case, the second connection 54 becomes the input connection and the first connection 52 is the output connection.

From the foregoing, it will be evident to those skilled in the art that valve 32 is responsive to a force less than any force which would be required to cause yielding of the link.

Let it now be assumed that the power assist for the steering mechanism has failed and that the vehicle is to be towed or pushed while two men wrench on steering wheel 44 in order to steer the vehicle manually. If the system is designed as outlined above, two men pulling on steering wheel 44 will, on the average, not be able to exert enough force on link 48 to collapse spring 72. In other words, if the vehicle can be steered at all manually, the dirigible wheels 6 and 8 will respond to the steering effort before spring 72 collapses under the forces to which it is subjected.

From the foregoing and from a study of the drawings, especially FIGS. 2–4, it will be apparent to those skilled in the art that link 48 can (and, indeed, must) transmit forces in either direction and that it can yield in either direction when a dirigible wheel is forcibly turned in either direction by contact with an immovable obstacle. Thus, if wheel 6 is forced counterclockwise about its pivot 10, actuator 16 will be forced clockwise about its pivot 18, putting link 48 in tension. Internally, link 48 will then change from the condition shown in FIG. 2 to the condition shown in FIG. 3, in which the link as a whole is extended. Conversely, if wheel 6 is forced clockwise, link 48 will be put in compression, changing internally from the condition shown in FIG. 2 to that of FIG. 4, wherein the link as a whole is compressed. Thus, link 48 itself is both compressible and extensible, although spring 72 is always collapsed when the link is subjected to a force at least as great as the predetermined force as defined above, whether the force is in a direction to extend the link or whether the force is in the opposite direction to compress the link.

It will be evident from the foregoing that this invention provides a steering mechanism having inherent safety characteristics which will give its operator better control over his equipment than is possible with present-day conventional equipment. Moreover, this control is accomplished by means of mechanism which is comparatively simple and rugged, and is thus correspondingly reliable. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. Steering mechanism comprising: an invertible power train having an input member and an output member and effective to transmit power from the input member to the output member with high efficiency and from the output member to the input member with low efficiency, the product of the two efficiencies being not more than one-half; operator-operable means connected with the input member; a compressible and extensible normally rigid link connected with the output member, the link being rigid when subjected to forces less than a predetermined force and thus capable of transmitting said forces and having means to yield when subjected to a force at least as great as the predetermined force; and means connecting the link with at least one dirigible member.

2. Steering mechanism for a vehicle having at least one dirigible member, the mechanism comprising: a movably mounted actuator; means connecting the actuator with the dirigible member whereby movement of the actuator steers the member; motor means connected to impart steering motion to the actuator; means to supply energy of a type capable of utilization by the motor means; an invertible power train having an input member and an output member and effective to transmit power from the input member to the output member with high efficiency and from the output member to the input member with low efficiency, whereby power flows through the train in one direction at a higher efficiency than in the other direction, the product of the two efficiencies being not more than one-half; operator-operable means connected with the input member; energy flow directing means having connections to receive and to discharge flowing energy and having at least two relatively movable parts, the relative movement of said parts being limited; means, including said connections of the energy flow directing means, to convey energy from the energy supply means to the motor means; and means connecting a dirigible member with the output member of the power train and comprising two elements connected in series, one of the two elements being the energy flow directing means and the other element being a normally rigid link having means to yield elastically when subjected to forces at least as great as a predetermined force and remaining rigid when subjected to forces less than the predetermined force, the energy flow directing means being connected through the medium of said two relatively movable parts.

3. A power steering system for a vehicle having a dirigible wheel and operator-operable means to control steering of the wheel, said system comprising a motor, an actuator connecting the motor with the dirigible wheel whereby movement of the motor effects steering movement of the dirigible wheel, a source of energy for the motor, means controlling the flow of energy from the source to the motor to determine the direction of steering and having at least two parts relatively movable to a limited extent in response to a force less than a predetermined force, and means connecting the operator-operable means with the dirigible wheel and including two elements connected in series, one of the two elements being the energy flow controlling means through the medium of said two relatively movable parts and the other element being a compressible and extensible link rigid when subjected to forces less than said predetermined force and having means to yield when subjected to a force at least as great as the predetermined force.

4. A power steering system for a vehicle having a dirigible wheel, comprising a motor, an actuator connecting the motor with the dirigible wheel whereby movement of the motor effects steering movement of the dirigible wheel, a source of energy for the motor, means controlling the flow of energy from the source to the motor to determine the direction of steering and having at least two parts relatively movable to a limited extent in response to a force less than a predetermined force, a power train having input and output connections and effective to transmit power from the input connection to the output connection with high efficiency and from the output connection to the input connection with low efficiency, whereby power flows through the train in one direction at a higher efficiency than in the other direction, operator-operable means connected with the input connection, and means connecting the dirigible wheel with the output connection of the power train and comprising two elements connected in series, one of the two elements being the energy flow controlling means and the other element being a compressible and extensible link rigid when subjected to forces less than said predetermined force and having means to yield when subjected to a force at least as great as the predetermined force, the energy flow controlling means being connected through the medium of said two relatively movable parts.

5. A power steering system for a vehicle having a dirigible wheel, comprising a motor, an actuator connecting the motor with the dirigible wheel whereby movement of the motor effects steering movement of the dirigible wheel, a source of energy for the motor, means controlling the flow of energy from the source to the motor to determine the direction of steering and having at least two parts relatively movable to a limited extent in response to a force less than a predetermined force, operator-operable means, invertible power transmitting means having input and output connections of which the input connection is connected with the operator-operable means, said transmitting means being means to transmit at least twice as much operator effort during power flow from the operator-operable means to the output connection as may be required to hold the operator-operable means against movement during power flow from the output connection to the operator-operable means, and means connecting the dirigible wheel with the output connection of the power transmitting means and comprising two elements connected in series, one of the two elements being the energy flow controlling means and the other element being a link rigid when subjected to forces less than said predetermined force and having means to yield when subjected to a force at least as great as the predetermined force, the energy flow controlling means being connected through the medium of said two relatively movable parts.

References Cited in the file of this patent

UNITED STATES PATENTS

| | | |
|---|---|---|
| 1,773,986 | Frazier | Aug. 26, 1930 |
| 1,990,530 | Dobson | Feb. 12, 1935 |
| 2,608,263 | Garrison | Aug. 26, 1952 |
| 2,676,663 | Smith | Apr. 27, 1954 |
| 2,738,202 | Burnett | Mar. 13, 1956 |

FOREIGN PATENTS

| | | |
|---|---|---|
| 745,519 | Great Britain | Feb. 29, 1956 |